Aug. 10, 1937.  E. RAPP  2,089,574

TABULATOR

Filed Aug. 13, 1936

INVENTOR.
Edward Rapp.
BY Joshua R. H. Potts
ATTORNEY.

Patented Aug. 10, 1937

2,089,574

UNITED STATES PATENT OFFICE 2,089,574

TABULATOR

Edward Rapp, Westmont, N. J.

Application August 13, 1936, Serial No. 95,763

5 Claims. (Cl. 199—30)

This invention has to do with "linotype" machines, and is concerned primarily with the provision of a tabulator attachment for the assembler slide whereby said slide is adapted to tabulator work.

At the present time the assembler slide of a "linotype" machine ordinarily has associated therewith a device known as a tight line release. This device ordinarily includes a sort of guide block through which the assembler slide passes, and on which block is pivotally mounted a lever which ordinarily holds the assembler slide against movement, but which lever may be operated to release the assembler slide when occasion demands.

The present invention has in view as an important objective the provision of a tabulator attachment which is intended to be mounted on the block of the tight line release ordinarily found associated with assembler slides of "linotype" machines.

In carrying out this idea in a practical embodiment, the pivoted lever of the tight line release is replaced by the tabulator attachment of this invention, which includes a lever that is mounted on the same axis as was the lever which it replaces. One arm of this lever carries a scale which is adapted for vernier readings, and is also provided with braking means for cooperating with the assembler slide to provide braking effects. On the opposite side of the pivotal point the lever has associated therewith spring means for normally urging said braking means into engagement with the bar, and an operating member for overcoming the effect of said spring means, whereby the bar may be released.

Various other more detailed objects and advantages of the invention will in part become apparent, and in part be hereinafter stated, as the description of the invention proceeds.

The invention, therefore, comprises a tabulator attachment for the assembler slide of a "linotype" machine, which comprises a lever designed to replace the lever of the usual tight line release, and which lever is mounted on the block of the tight line release. A scale which is adapted for vernier readings is carried by one end of said lever, as is a braking device, while the opposite end of the lever has associated therewith spring means for urging said braking device into engagement with the assembler slide, and an operating member for overcoming the effect of said spring means.

Figure 1:
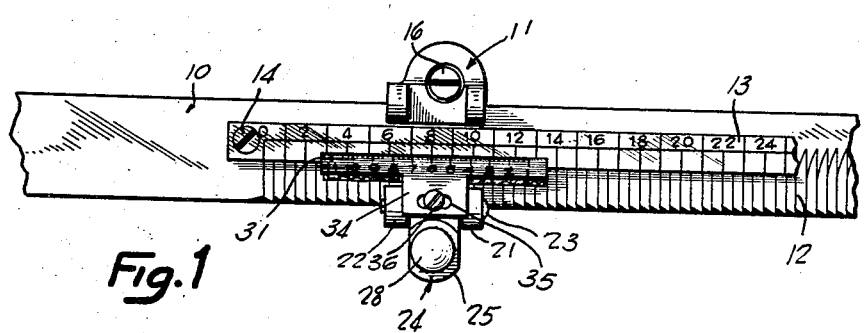
Figure 2:
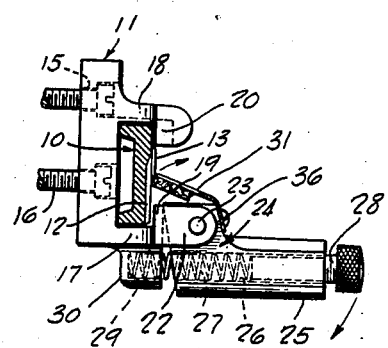
Figure 3:
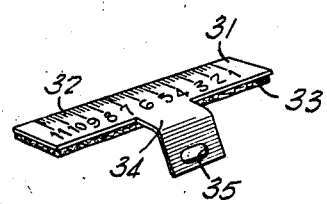

For a full and more complete understanding of the invention, reference may be had to the following description and accompanying drawing, wherein, Figure 1 is a plan view of a portion of an assembler slide having a tabulator attachment applied thereto, in accordance with the precepts of this invention, Figure 2 is a view taken at right angles to the showing of Figure 1, with the assembler slide shown in section, and Figure 3 is an enlarged detailed view in perspective of the tabulator scale and braking member carried thereby.

Referring now to the drawing, wherein like reference characters denote corresponding parts, an assembler slide is indicated at 10. This assembler slide 10 is of the type ordinarily found in linotype machines, and the assembler slide 10 ordinarily slides through a block, referred to generally at 11, which in certain types of known machines constitutes a block of the so-called tight line release.

Referring more particularly to Figure 1, the slide 10 is shown as being formed with a serrated surface 12, which is designed to render the bar more adaptable to having a braking member effectively applied thereto. The assembler slide 10 is also shown as having assembled therewith a bar or strip 13, which carries suitable indicia. This strip 13 may be assembled and maintained in position on the slide 10 in any preferred manner, as by counter-sunk screws shown at 14.

Referring now more particularly to Figure 2, the block 11 is shown as formed with openings 15, through which may pass fastening elements in the form of screws or bolts 16, which effectively mount the block 11 on proper supporting structure. On each side of the slide 10 the block 11 is formed with upwardly extending members 17 and 18 respectively, and each of these members 17 and 18 are formed with over-hanging flanges, identified as 19 and 20 respectively.

It is evident that the block 11, members 17 and 18, and flanges 19 and 20 all cooperate to provide an effective guide through which the assembler slide 10 passes.

The upwardly extending member 17 is formed with spaced ears 21 and 22, across which extends a pivot pin 23. A lever member 24 is positioned between the ears 21 and 22, and is pivotally mounted on the pin 23. At the side of the pivot 23, outwardly of the assembler slide 10, the lever 24 is formed with a tubular extension 25, having a bore identified at 26, and in which bore is received a coil spring 27.

A headed screw member, shown at 28, is threaded into the bore 26 at the upper end of the extension 25, and has its extremity in engagement with one end of the coil spring 27. The other extremity of the spring 27 is received in a recess 29 formed in a projection 30, which extends outwardly from the block 11.

The spring 27 normally exerts a tendency urging the tubular extension 25 upwardly, or in a counter-clockwise direction, speaking with reference to the showing of Figure 2. It is evident that the tension of the spring 27 may be varied by adjustment of the member 28.

Mounted on the lever member 24, on the opposite side of the pivot pin 23, is a bar 31, carrying indicia 32, which is designed to cooperate with the indicia on the strip 13 to provide vernier readings. The back of the strip 32 preferably carries a piece of material which is designed to engage with the serrated surface 12 with the slide 10 to provide braking effects. This strip may be made from any appropriate material, such as rawhide, which is indicated at 33.

As shown in Figure 3, the bar 31 is formed with a tab 34 intermediate the extremities thereof, and the extremity of the tab 34 is bent into the angular position clearly shown in Figures 2 and 3. The angularly disposed portion of the tab 34 is formed with a slot 35, through which extends a screw member 36, which secures the tab 34 to the lever member 24.

It is evident that the arrangement of the slot 35 and the screw member 36 permits of adjustment of the tabulator bar 31 with respect to the lever member 24.

During the ordinary use of the assembler slide 10, the indicia on the bar 31 and the strip 13 cooperate when the tabulating work is being carried out. In order to move the assembler slide 10, it is necessary to depress the tubular extension 25 against the influence of the spring 27, the direction of movement of the extension 25 being indicated by the arrow in Figure 2. This movement on the part of the lever member 24 is accompanied by a movement of the tabulator bar 31 and brake strip 33 in the direction of the other arrow of Figure 2, which is away from the slide 10. This movement serves to remove the brake strip 33 from the serrated surface 12, to permit of movement of the slide 10 through the block 11.

However, upon release of the tubular extension 25, the spring 27 becomes effective to urge the brake strip 33 into engagement with the serrated surface 12 of the slide 10 to hold the latter against movement.

While a preferred specific embodiment of the invention is hereinbefore set forth, it is to be clearly understood that I am not to be limited to the exact construction illustrated and described, because various modifications of these details may be provided in putting the invention into practice within the purview of the appended claims.

I claim:

1. A tabulator for "linotype" machines comprising a block through which passes an assembler slide of a "linotype" machine, a lever pivotally mounted on said block, a tabulator bar carried by said lever, a braking device associated with said tabulator bar, and spring means for yieldably urging said braking device into engagement with the bar.

2. A tabulator for "linotype" machines comprising a block through which an assembler slide passes, a lever member pivotally mounted on said block, a tabulator bar carried by said lever member, a brake member also carried by said lever member, spring means for yieldably urging said brake member into engagement with the assembler slide, and means for varying the tension of said spring means.

3. A tabulator for "linotype" machines comprising a block through which an assembler slide passes, a lever member pivotally mounted on said block, a tabulator bar carried by said lever member, a brake member also carried by said lever member, and spring means for yieldably urging said brake member into engagement with the assembler slide, said lever member being formed with an extension constituting an operating member for overcoming the effect of said spring means to release the brake.

4. A tabulator for "linotype" machines comprising a block formed with upwardly extending extensions having overhanging flanges which define a channel through which an assembler slide of the "linotype" machine passes, one of said extensions being formed with spaced ears, a lever member pivotally mounted between said spaced ears, a tabulator bar adjustively carried by said lever member, a strip of braking material carried by said tabulator bar, said lever member being formed with a tubular extension, a coil spring in said tubular extension engaging said lock at one end, and an adjustable screw member in said tubular extension engaging the coil spring at the other end.

5. A tabulator for "linotype" machines comprising an assembler slide, a block through which the assembler slide passes, a lever member pivotally carried by said block, a tabulator bar having indicia thereon and carried by said lever member, there being an adjustable connection between said tabulator bar and said lever member, a braking device associated with said tabulator bar for holding the assembler slide against movement with respect to the block, and an operating member for overcoming the effect of said braking device.

EDWARD RAPP.